US008259596B1

(12) United States Patent
Oak

(10) Patent No.: US 8,259,596 B1
(45) Date of Patent: Sep. 4, 2012

(54) METHOD FOR MANAGING IP ADDRESSES IN A NETWORK GAMING ENVIRONMENT

(75) Inventor: Steven R. Oak, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 1156 days.

(21) Appl. No.: 11/464,906

(22) Filed: Aug. 16, 2006

(51) Int. Cl.
*H04J 1/16* (2006.01)
*H04L 12/28* (2006.01)

(52) U.S. Cl. .................. 370/252; 370/392; 370/420

(58) Field of Classification Search ............... 709/223, 709/217, 227, 245, 219, 220, 224, 225; 370/392, 370/395.3
See application file for complete search history.

(56) References Cited

U.S. PATENT DOCUMENTS

| | | | |
|---|---|---|---|
| 6,028,848 A | 2/2000 | Bhatia et al. | |
| 6,052,725 A * | 4/2000 | McCann et al. | 709/223 |
| 6,073,178 A | 6/2000 | Wong et al. | |
| 6,094,659 A * | 7/2000 | Bhatia | 707/104.1 |
| 6,427,170 B1 | 7/2002 | Sitaraman et al. | |
| 6,792,474 B1 * | 9/2004 | Hopprich et al. | 709/245 |
| 6,829,239 B1 | 12/2004 | Bhatia et al. | |
| 6,920,506 B2 * | 7/2005 | Barnard et al. | 709/245 |
| 6,934,765 B2 * | 8/2005 | Held et al. | 709/245 |
| 7,444,415 B1 | 10/2008 | Bazzinotti et al. | |
| 2003/0070063 A1 * | 4/2003 | Boyle et al. | 713/2 |
| 2003/0134680 A1 | 7/2003 | Moik et al. | |
| 2003/0140283 A1 * | 7/2003 | Nishio | 714/43 |
| 2005/0055575 A1 | 3/2005 | Evans et al. | |
| 2005/0153778 A1 * | 7/2005 | Nelson et al. | 463/42 |
| 2005/0170892 A1 | 8/2005 | Atkinson | |
| 2006/0154729 A1 | 7/2006 | LeMay et al. | |
| 2006/0173988 A1 * | 8/2006 | Yamashita | 709/223 |
| 2007/0049375 A1 | 3/2007 | Benbrahim et al. | |
| 2007/0054741 A1 | 3/2007 | Morrow et al. | |
| 2008/0076577 A1 | 3/2008 | Brosna et al. | |

* cited by examiner

*Primary Examiner* — Melanie Jagannathan
(74) *Attorney, Agent, or Firm* — Steptoe & Johnson LLP

(57) ABSTRACT

Disclosed are systems and methods for managing Internet Protocol ("IP") addresses in a network gaming environment comprising a plurality of electronic gaming machines, having one or more in-game network devices. In particular an in-game switch is provided, which is configured to receiving an external IP address from a centrals DHCP server and to determine a scope of internal IP addresses associated with the one or more in-game network devices. Once the scope is determined, the in-game switch is configured to lease IP addresses from the address scope block to the associated in-game network devices.

23 Claims, 5 Drawing Sheets

METHOD FOR MANAGING IP ADDRESSES IN A NETWORK GAMING ENVIRONMENT

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

RELATED APPLICATIONS

This application is related to co-pending U.S. patent application Ser. No. 11/464,915 filed Aug. 16, 2006.

FIELD OF THE INVENTION

The disclosure relates to the field of computer networks and more specifically to the methods and systems for managing and distributing Internet Protocol (IP) addresses in a network gaming environment.

BACKGROUND OF THE INVENTION

Fuelled by the growth of computer and networking technologies, today's gaming industry is able to offer a large variety of highly sophisticated and entertaining gaming options to casino patrons. For example, a typical casino offers a large variety of electronic games including: wagering games, such as video and mechanical slots; video card games, such as poker, blackjack, and the like; video keno; video bingo; video pachinko; and other video games. In addition, the casinos offer a large variety of table games, such as poker, blackjack, craps, roulette, and the like. These video and table games are frequently computerized to make playing experiences more exciting and entertaining, as well as to optimize the casino's ability to monitor and control the gaming environment.

In a typical casino, computerized gaming machines are often interconnected into one or more local and wide area networks, which are then connected to the "back office" computing systems, that support the gaming environment by providing various accounting, game-monitoring, authentication, and other services. For example, some casinos employ wired, IEEE 802.3-based, communication networks, while others use wireless, IEEE 802.11-based, networking infrastructure. The resulting distributed computer network typically uses various Internet Protocol ("IP") based services, protocols and software and hardware network devices for providing a secure, reliable, and scalable gaming environment.

The proliferation of electronic gaming machines requires sophisticated methods for managing the ever increasing complexity and size of network gaming environments. For example, a typical casino may include hundreds of different games, each comprising hundreds of gaming machines that are interconnected into an IP-based network. Furthermore, each gaming machine may comprise various in-game network devices, such as bill validator, printer, card read, or the like, that facilitate operation of the gaming machine. Configuration, management, and troubleshooting of a gaming network of such magnitude and complexity are daunting tasks even for the largest and most experienced information technology ("IT") departments. These tasks are only exacerbated by the round-the-clock operation of a casino, in which gaming machines must be running 24/7 and any downtime results in the loss of revenue.

One problem in network gaming environments is the apparent inability of the standard IP-based protocols and network devices to support networks of such magnitude in highly demanding operating conditions. For example, to begin proper operation during system start-up, which may occur after a power interruption or other event that results in a system shutdown, the electronic gaming machines and the associated in-game devices need to obtain their IP addresses, as well as other network and system configuration information from a central Dynamic Hosting Configuration Protocol ("DHCP") server. If this information is not received in a timely manner, the electronic gaming machines and the associated in-game devices will typically set themselves up in a non-communicable address range or set its IP address to all zeros. Then, they may either retry or stop communications, depending on the sophistication level of their IP programming.

In a centralized DHCP schema, which is typically implemented in a medium to large casino, at power-up of the entire casino, 10,000 to 30,000 network devices may be requesting simultaneously IP address leases from a central DHCP server. Most standard DHCP servers can handle only 50-100 leases per second. That leaves many network devices suspended and inoperative while awaiting service from the DHCP server. There is also a massive amount of network traffic as each gaming machine and network devices therein broadcast for DHCP lease. This can overwhelm the network routers and switches, exacerbating the problem. Presently, there is no adequate solution in the industry for this problem. Accordingly, there is a need for a mechanism for efficient and effective management and distribution of IP addresses in a network gaming environment.

SUMMARY OF THE INVENTION

Briefly, and in general terms, disclosed herein are systems and methods for managing and distributing IP address information in a network gaming environment, such as a casino. In particular, by implementing an in-game (i.e., located inside a gaming machine) IP address management system, the network flood of service discovery requests from the in-game network devices associated with various gaming machines in the gaming network can be avoided especially in catastrophic situations, such as a full casino power outage. In one embodiment, this may be accomplished by providing an in-game switch, which facilitates during system start-up management and distribution of external and internal IP addresses of the given gaming machine and the associated in-game network devices. For example, the in-game switch maintains an external IP of the given gaming machine and internal IP address scope information associated with various in-game network devices.

In one embodiment, the in-game switch is also configured to manage IP address distribution process during system start-up. The in-game switch is configured to intercept service discovery requests from the in-game network devices during system start-up and, in response, extend leases for the default internal IP addresses, with or without communication with DHCP server. This allows each gaming machine and the associated in-game network devices to boot up without overflowing gaming network with service request discovery messages. Once the gaming machine is running, the in-game switch may request external and internal IP address information from the DHCP servers and reassign internal IP address leases. Thereby, the in-game switch provides a centralized and readily configurable system for distribution and management of IP addresses inside a gaming machine.

In one embodiment, a gaming network is disclosed. The gaming network comprises one or more gaming machines operative to provide gaming presentations to casino patrons. Each gaming machine comprises one or more in-game network devices, which facilitate operation of the gaming machine. The network further comprises an in-game switch, located within the gaming machine, and networked with one or more in-game network devices for managing IP address information of the in-game network devices. The network also contains a local DHCP server operative to provide the internal IP address scope to the in-game switch and a remote DHCP server operative to provide an external IP address to the in-game switch. The local server of the gaming network comprises a DHCP server internal to the gaming network and the remote server comprises a DHCP server external to the gaming network. It is understood, however, that such a configuration is not required.

In one embodiment, the in-game switch comprises a non-volatile memory having a data structure therein comprising the external IP address associated with a given gaming machine, the internal IP address scope associated with the in-game network devices, and a default IP address scope information. The in-game switch further comprises a volatile memory having a data structure therein comprising a list of the leased internal IP addresses and the identifiers of the in-game network devices. The identifier of an in-game network devices may comprise a Medium Access Control ("MAC") address of the given device's network card. The in-game switch also comprises a processor configured to extend to the in-game network devices leases to the internal IP addresses selected either from the provided internal IP address scope or from the default IP address scope.

In another embodiment, an in-game switch is disclosed for managing IP addresses of one or more in-game network devices associated with a given gaming machine. The in-game switch comprises a network interface configured to receive an external IP address associated with a given gaming machine, an internal IP address scope associated with the given gaming machine, and a request for an internal IP address from the in-game network devices associated with the given gaming machine. The request from the in-game network device for an internal IP address may comprise one of a DHCP discover message and a Boot Protocol ("BOOTP") boot request message. The in-game switch may further comprise a non-volatile memory having a data structure configured to store the received external IP address, the received internal IP address scope, and a default IP address scope associated with the given gaming machine.

The in-game switch may also comprise a processor configured to process service discovery requests from the in-game network devices. In particular, upon receipt of the service discovery request through the network interface, the processor determines whether internal IP address scope information was received from DHCP server in the given communication session. If such information was not received in the current communication session, the processor leases to the in-game network device a temporary IP address selected from one of the internal IP address scope received in the previous communication session or from default IP address scope if internal IP address scope was not previously communicated. In the event of the subsequent receipt of the internal IP address scope information from the DHCP server, the processor terminates previously extended temporary IP address leases and reassigns to the in-game network devices internal IP address selected from the newly received internal IP address scope.

Yet in another embodiment, a method is disclosed for managing IP addresses in a gaming network having one or more gaming machines, wherein each gaming machine comprises one or more in-game network devices. The method comprises determining an external IP address associated with a given gaming machine, determining an internal IP address scope associated with the given gaming machine, receiving a request for an internal IP address from an in-game network device associated with the given gaming machine, and leasing an internal IP address from the internal IP address scope to the in-game network device. The determination of the external IP address may comprise broadcasting a service discovery message, and receiving the external IP address from a remote DHCP server in response to the service discovery message, wherein the remote DHCP server is external to the gaming network. The service discovery message may comprise one of a DHCP discover message or a BOOTP boot request message. The received external IP address may be stored in a non-volatile memory.

In one embodiment, in the event of failure to receive the external IP address from the remote DHCP server or in the event of failure to receive the internal IP address scope from the local DHCP server, the method further comprises leasing to the in-game network device an internal IP address selected from a default IP address scope. In the event of the subsequent receipt of the external IP address from the remote DHCP server and the internal IP address scope from the local DHCP server, the method comprises terminating one or more previously extended leases for the default IP addresses and leasing to the in-game network devices internal IP address selected from the newly received internal IP address scope.

Yet in another embodiment, a method is disclosed for managing IP addresses in a gaming network comprising one or more gaming machines, wherein each gaming machine comprises one or more in-game network devices. The method comprises requesting an external IP address associated with a given gaming machine, requesting an internal IP address scope associated with a given gaming machine, receiving a request for an internal IP address from an in-game network device associated with the given gaming machine, and if the external IP address and the internal IP address scope were received, leasing to the in-game network device an internal IP address selected from the internal IP address scope, otherwise leasing to the in-game network device a temporary IP address selected from the internal IP address scope received in the previous communication session or from default IP address scope if internal IP address scope was not previously communicated. In the event of the subsequent receipt of updated internal IP address information, the terminating previously extended temporary IP address leases and reassigns to the in-game network devices internal IP address selected from the updated internal IP address scope.

In the above method, requesting an external IP address comprises broadcasting a service discovery message, and receiving the external IP address from a remote DHCP server in response to the service discovery message, wherein the remote DHCP server may be external to the gaming network. Furthermore, requesting the internal IP address scope comprises requesting the internal IP address scope from a local DHCP server, and receiving the internal IP address scope from the local DHCP server, wherein the local DHCP server may be internal to the gaming network. The method further comprises storing the received external IP address and the internal IP address scope in a non-volatile memory. Moreover, the request from the in-game network device for an internal IP address may comprise one of a DHCP discover message or a BOOTP boot request message.

In another embodiment, an electronic gaming machine is disclosed for display one or more gaming presentations to a user. The gaming machine comprising: one or more in-game network devices that facilitate display of the gaming presentations to a user. The machine further comprising a non-volatile memory containing a data structure therein, the data structure comprising: (i) the external IP address information associated with a given gaming machine; (ii) the internal IP address scope information associated with the in-game network devices; (iii) scope options information; and (iv) vendor specific information. The machine further comprising an in-game switch configured to manage an internal IP address scope for the one or more in-game network devices. The in-game switch is configured to receive (i) an updated external IP address information, (ii) an updated internal IP address scope information, (iii) an updated scope options information and (iv) updated vendor specific information. The in-game switch is further configured to store the received updated information in the data structure in the non-volatile memory. The in-game switch is also operative to provide upon request the updated information to the in-game network devices.

Other features and advantages of the claimed invention will become apparent from the following detailed description when taken in conjunction with the corresponding drawings that illustrate, by way of example, the features of the claimed invention.

DETAILED DESCRIPTION OF THE INVENTION

Preferred embodiments of the claimed invention provide systems and methods for managing and distributing IP addresses in a network gaming environment, such as a casino. In particular, by implementing an in-game DHCP management system, the network flood of DHCP requests can be avoided especially in catastrophic situations, such as a full casino power outage. Since an in-game switch is configured to maintain all of its external IP address information and its internal IP address block for a given gaming machine, the in-game switch can start extending leases for the internal IP addresses to the in-game network devices immediately upon power up, with or without, communication with central DHCP servers. The in-game switch can then check its stored information with the central DHCP servers and redo the leases, if necessary. The data packets from the in-game network devices may be intercepted by the in-game switch, so that the in-game switch can control the egress of communication from the gaming machine and prohibit such communication until all IP information is correct for the network on which the given gaming machine resides.

Figure 1:
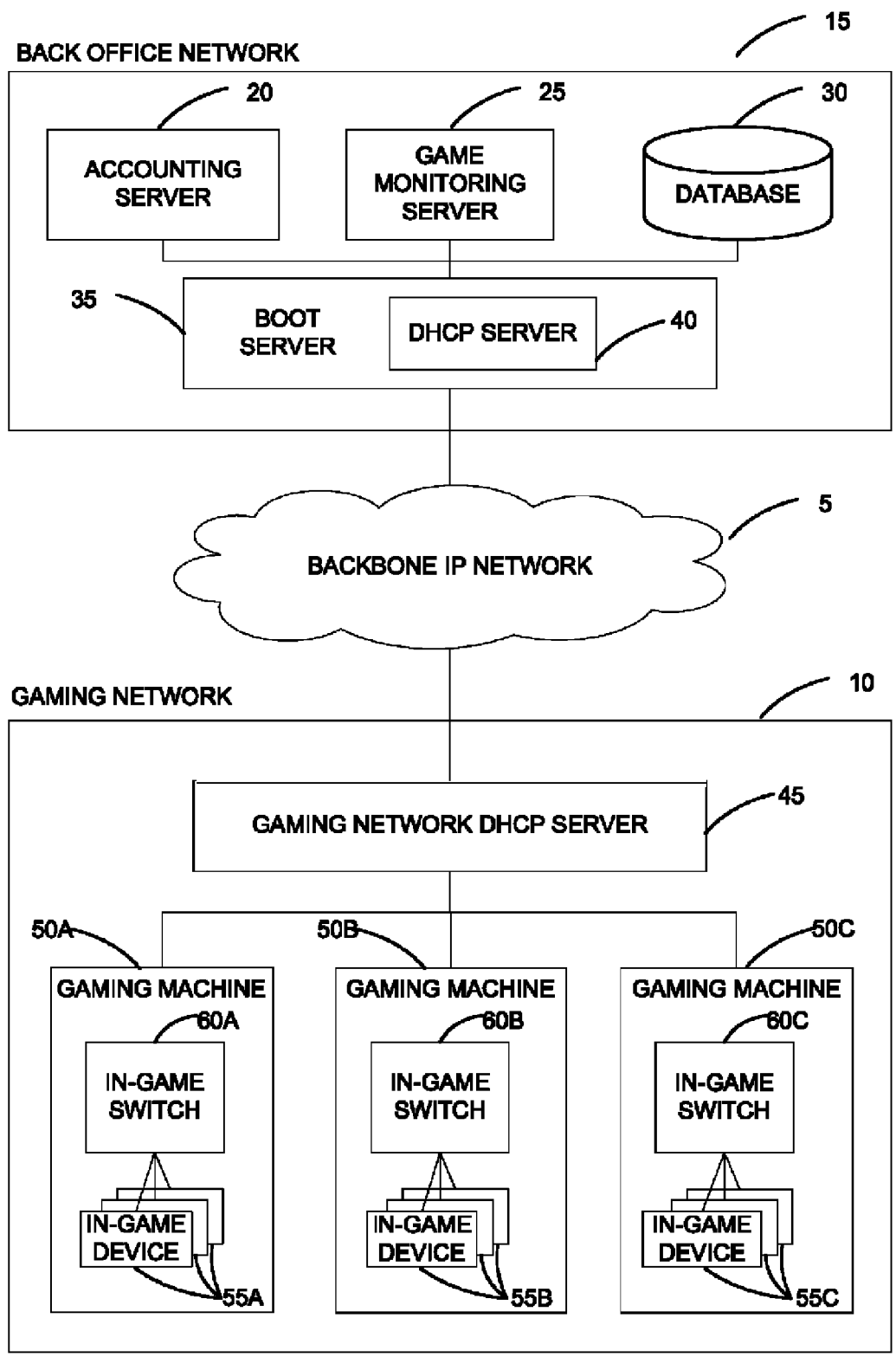
FIG. 1 illustrates a block diagram of a network gaming environment.

Referring now to the drawings, wherein like reference numerals denote like or corresponding parts throughout the drawings and, more particularly to FIG. 1, there is shown one embodiment of a network gaming environment that utilizes systems and methods of the claimed invention. As depicted, the gaming environment may include one or more gaming networks 10, each of which may include a gaming network DHCP server and a plurality of gaming machines 50, each gaming machine including one or more in-game network devices 55 and an in-game switch 60. Each gaming network 10 may be a Local Area Network (LAN) or a Wide Area Network ("WAN"), which spans one or more casinos. It will be appreciated by one of ordinary skill in the art that any type or configuration of network may be used. The gaming environment may further include a back office network 15, which in turn includes a plurality of servers that facilitate operation of the casino, and in particular, various network devices of the gaming networks 10. The gaming network 10 and the back office network 15 may be interconnected via a broadband, IP-based backbone network, such as a Gigabit Ethernet, Asynchronous Transfer Mode ("ATM"), or the like.

In one embodiment, the back office network 15 may include a game-monitoring server 25, which facilitates monitoring of, for example, player identification information, player wager information, player credits, winning events, and the like. In addition, the game-monitoring server 25 may provide various content updates for the gaming machine 50 and the associated in-game network devices 55, as well as upload game status information from the gaming machine 50. The back office network 15 may further include an accounting server 20, which provides secure credit card processing services for players utilizing credit/debit cards at the gaming machine 50, as well as other accounting and financial services, such as tracking of the cumulative jackpots across several gaming machines 50 and the like. The back office network 15 further includes one or more databases 30, which maybe used by the servers of the back office network 15 to archive accounting data, game status and statistics data, user authentication data, network information data and the like.

The back office network 15 may further include a boot server 35. In general, the boot server 35 facilitates automatic addressing and configuration of all network devices connected to the gaming network 10. In particular, the boot server 35 may provide authentication services to the gaming environment DHCP server 45, in-game switches 60, and in-game network devices 55. The required authentication information may be stored in a database 30 located on the back office network 15. In one embodiment, the boot server 35 may also provide various network and device configuration information, such as gateway server location, network addresses, clock synchronization information, content updates and the like to the gaming machines 50. In particular, the boot server 35 may operate in conjunction with the game-monitoring server 25 to provide during system start up various device and network configuration information to the gaming machine 50 and the associated in-game network devices 55.

In one embodiment, the boot server 35 may contain a network address management and distribution component, such as a DHCP service 40, which facilitates the distribution of IP-addresses to the in-game network devices 55 using a Dynamic Host Configuration Protocol. In another aspect of the embodiment, the in-game devices are forced to renew their IP addresses. The latest specification of the DHCP version 6 is provided by the Internet Engineering Task Force ("IEFT") in RFC 3315, entitled DHCP Reconfigure Extension, December 2001, which is incorporated by reference herein. It is understood that the claimed invention is not limited to the DHCP version 6, however. In another embodiment, the network address management distribution component may utilize a Bootstrap Protocol ("BOOTP") to distribute IP addresses to the in-game devices 55 of the gaming machine 50. The original specification of the BOOTP protocol is provided by the IEFT in RFC 951, entitled Bootstrap Protocol (BOOTP), September 1985, which is incorporated by reference herein. Of course, the RFC 951 specification should not be construed as limiting. Still another relevant reference provided by the IEFT is RFC 2131, entitled Dynamic Host Configuration Protocol, March 1997, which is incorporated by reference herein. Yet another relevant reference provided by the IEFT is RFC 3203, entitled DHCP reconfigure extension, December 2001, which is incorporated by reference herein. Currently, RFC 3203 is not yet a standard, but is on the standard track. Of course, the RFC 3203 specification should not be construed as limiting. Finally, in other embodiment, any other network protocol or schema known to those of skill in the art may be used to manage and distribute IP addresses to the in-game network devices 55 of the gaming machine 50.

In one embodiment, the DHCP service 40 is configured to respond to the service discovery requests, such as a DHCP_Discover or a BOOTP boot request message, from the in-game switches 60, which may typically occur during system start up or shortly thereafter. Once such a request is received, the DHCP server 40 may respond by assigning a lease for an external IP address to the in-game switch 60. The assigned external IP address identifies the in-game switch 60 at least on the gaming backbone IP network 5, the gaming network 10 and back office network 15. For example, the in-game switch 60 may use the provided external IP address to communicate with other network devices in the gaming environment. In one embodiment, the in-game switch 60 may use the external IP address to identify the associated gaming machine 50 to the gaming network devices and back office network devices, as will be described in greater detail herein with reference to FIG. 3.

Depending on implementation, the DHCP server 40 has three methods of allocating external IP-addresses to the in-game switches 60. The first is manual allocation, in which the DHCP server performs the allocation based on a table with Medium Access Control ("MAC") address—IP address pairs manually filled by the gaming network environment administrator. In this method, leases for IP-addresses are extended only to the in-game switches with MAC addresses listed in this table. Next, in automatic allocation, the DHCP server 40 permanently assigns an external IP-address to the requesting in-game switch 60 from a range of IP addresses determined by the network administrator. Lastly, dynamic allocation is a method that provides dynamic re-use of IP addresses. A network administrator assigns a range of IP addresses to the DHCP server 40, and each in-game switch 60 has its TCP/IP software configured to request an IP address from the DHCP server 40 when the given in-game switch 60 starts up. In either embodiment, the request-and-grant process may use a lease concept with a controllable time period, so that the network administrator may define a period for with the external IP address is valid for the given in-game switch.

As depicted in FIG. 1, the gaming network 10 may include a gaming network DHCP server 45 and a plurality of gaming machines 50. Gaming machines 50 may be physically or logically distributed between on or more casinos based on game type, manufacturer or other parameters known to those of skill in the art. The gaming machines 50 may be physically organized in a LAN or logically in a Virtual LAN ("VLAN"). The gaming machine 50 contains programming logic, which may be embodied in the hardware and/or software, to facilitate presentation of the game. In one embodiment, a given gaming machine 50 may provide several different games.

Gaming machines 50 may include an electronic or electromechanical, computerized device that provides one or more game presentations to the casino patrons. The gaming machine 50 may include computerized wagering games, such as video and mechanical slots, video card games, such as poker, blackjack and the like, video keno, video bingo, video pachinko, and computerized table games, such as poker, blackjack, craps, roulette, and the like.

Figure 2:
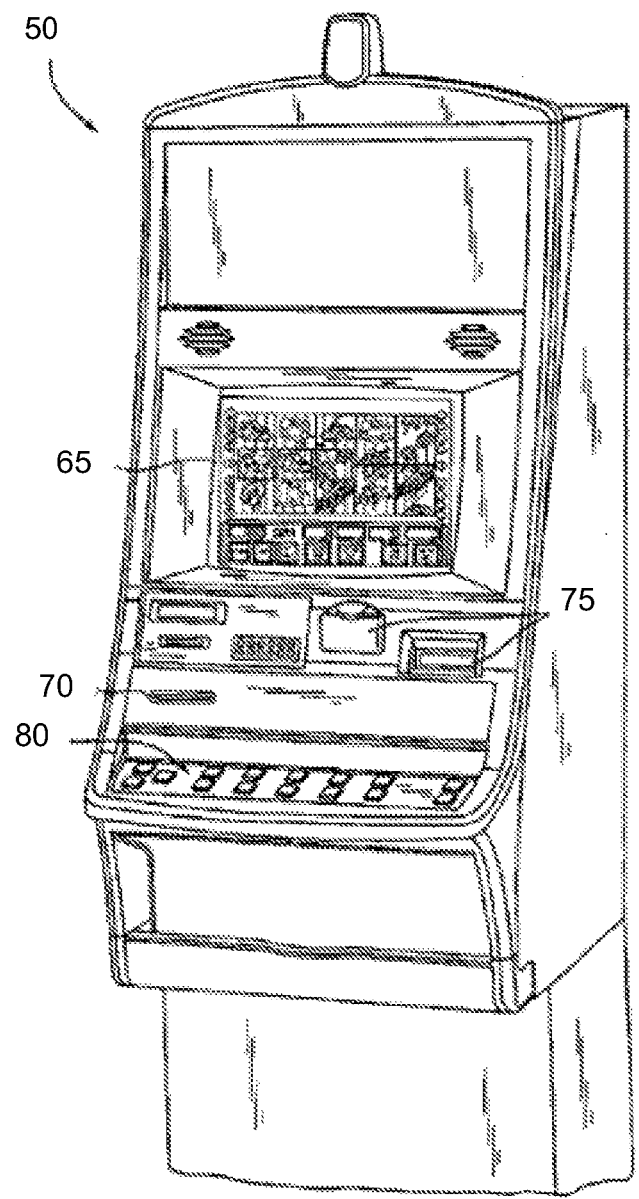
FIG. 2 illustrates an exemplary electronic gaming machine.

An exemplary embodiment of a gaming machine 50 is illustrated in FIG. 2. As depicted, gaming machine 50 may include several different in-game devices, such as a video display 65, such as a cathode ray tube (CRT), liquid crystal display (LCD), plasma, or other type of video display known in the art. A touch screen may overlay the display 65. The gaming machine 50 may also include in-game device 70 that facilitates player identification, such as a magnetic card reader that accepts player-identification card issued by the casino. The gaming machine 50 also includes an in-game devices 75 that facilitates credit receiving to be used for placing wagers in the game. The credit receiving in-game device 75 may, for example, include a coin acceptor, a bill acceptor, a ticket reader, and a card reader. The bill acceptor and the ticket reader may be combined into a single unit. The card reader may, for example, accept magnetic cards, such as credit cards, debit cards, and smart (chip) cards coded with money or designating an account containing money.

In some embodiments, the gaming machine 50 includes a user interface having a plurality of push-buttons 80, the above-noted touch screen 65, and other possible devices. The plurality of push-buttons 80 may, for example, include one or more "bet" buttons for wagering, a "play" button for commencing play, a "collect" button for cashing out, a "help" button for viewing a help screen, a "pay table" button for viewing the pay table(s), and a "call attendant" button for calling an attendant. Additional game specific buttons may be provided to facilitate play of the specific game executed on the machine. The touch screen may define touch keys for implementing many of the same functions as the push-buttons. Additionally, in the case of video poker, the touch screen may implement a card identification function to indicate which cards a player desires to keep for the next round. Other possible user interface devices include a keyboard and a pointing device such as a mouse or trackball.

The gaming machine 50 may also include an embedded additional user interface (not depicted), such as an iView™ interface described in the commonly owned U.S. patent application Ser. No. 10/943,771, entitled USER INTERFACE SYSTEM AND METHOD FOR A GAMING MACHINE, which is incorporated by reference herein. The embedded additional user interface includes a web page display screen and an embedded processor. The embedded processor reads incoming data, translates the data into a web authoring language, and maps the data to the web page display screen. The display screen presents web page information to the user via the display screen, thereby increasing user excitement by providing a richer gaming experience. The content provided through the embedded additional user interface may include, for example, advertisements, promotion notifications, useful gaming information, and other content that may be of interest to the casino patron.

The gaming machine 50 may further include a processor (not depicted), which implements the programming logic of the game and controls operation of all hardware and software components of the gaming machine 50, as well as one or more of the above-described in-game devices. For example, in response to receiving a wager and a command to initiate play, the processor may be configured to randomly select a game outcome from a plurality of possible outcomes and causes the display 65 to depict indicia representative of the selected game outcome. In the case of slots, for example, mechanical or simulated slot reels are rotated and stopped to place symbols on the reels in visual association with one or more pay lines. If the selected outcome is one of the winning outcomes defined by a pay table, the processor may be configured to award the player with a number of credits associated with the winning outcome.

The gaming machine 50, as well as individual in-game devices 55, may include network interfaces (not depicted), such as one or more network cards, to facilitate IP-based communication with other devices in the gaming network 10 and back office network 15. For example, to facilitate placement of wagers using credit or debit card, the in-game device 80 may need to connect through its IP-based network interface to the accounting server 20, which in turn will connect to the financial institution that has issued the given card, conduct credit card authentication process, and credit the requested amount. The accounting server 20 will issue credit confirmation to the in-game network device 80, which in turn will allow casino patron to place the desired wager and proceed with the game. In another example, in a progressive network environment, where several gaming machines 50 compete for a single jackpot price, the gaming machine 50A may need to communicate through its network interface with gaming machines 50B and 50C, as well as with the game monitoring server 25 in the back office network 15 to synchronize the jackpot value and other shared parameters.

To effectuate IP-based communication with other network devices of the gaming environment, each gaming machine 50 may include an in-game switch 60, which in conjunction with gaming network DHCP server 45 and the central DHCP server 40 facilitates management and distribution of IP address information among the in-game network devices 55. The switch 60 maybe implemented as a hardware or software network device, such as a switch, a router, an access point or the like, which has an OSI Layer 3 (i.e., network layer) switching capability and which supports either a DHCP, BOOTP or similar IP address distribution protocol. In one embodiment, the in-game switch 60 may include a hardware-based network switch, which supports DHCP, such as one of 3Com® 8800 series switches, Cisco Systems® Catalyst switches, Netgear® switches, Lynksys® switches or the like. In alternative embodiment, the in-game switch 60 may be implemented as a software component stored in the non-volatile memory of the gaming machine 50.

Figure 3:
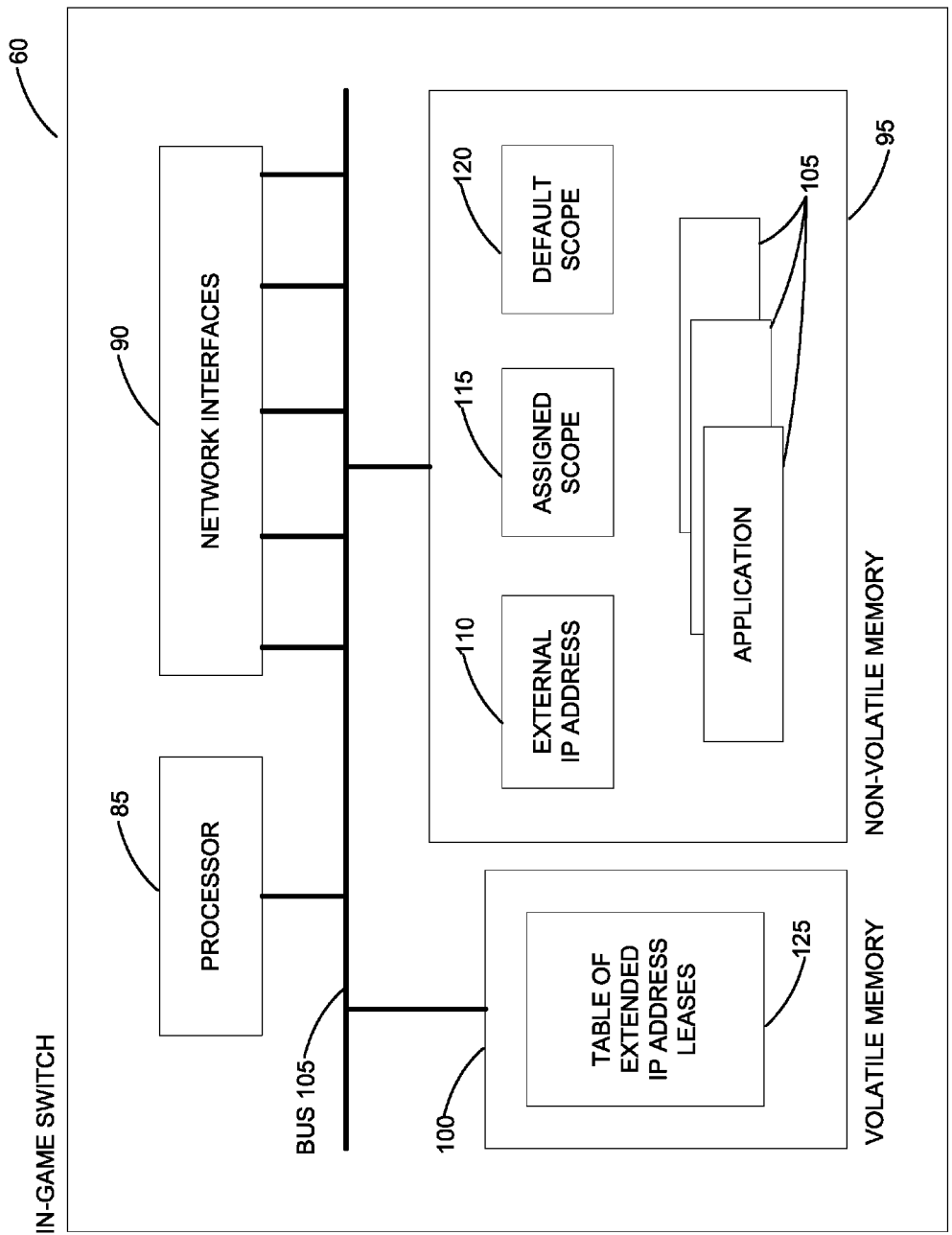
FIG. 3 illustrate a block diagram of an in-game switch.

One embodiment of the in-game switch 60 is illustrated in FIG. 3. As depicted the in-game switch 60 may include a processor 85 configured to perform computational and logical operations. The switch further includes one or more network interfaces 90, such as an IEEE 802.3 Ethernet and/or IEEE 802.11 WiFi card, which facilitates IP-based communication with other network devices. The switch may also include a volatile memory 100, such as Random Access Memory ("RAM"), which temporarily stores information in the switch 60, and a non-volatile memory 95, such as a magnetic disk, optical disk or the like, for storing information that persists even when the switch 60 is turned off or otherwise loses power. The information stored in the non-volatile memory may include network monitoring applications 105 and programming logic for implementation of the methods of the invention. All components of the in-game switch 60 are connected to the internal system bus 105, such as a parallel or serial bus, which facilitates transfer of data between various system components.

In one embodiment, the in-game switch 60 may be configured to boot up without an IP address, which would enable it to communicate with other network devices. Therefore, switch 60 may further be configured to search through one or more network interfaces 90 for an IP address management and configuration component, such as the central DHCP server 40, which would provide it with an external IP address for the gaming machine 50. To that end, in accordance with one embodiment, the in-game switch 60 is configured to broadcast on the backbone IP network 5 a service discovery message, such as a DHCP_Discover message, a BOOTP boot request message or the like. As discussed above, the central DHCP server 40 is configured to recognize such messages and to lease a unique external IP address to the in-game switch 60 if the given switch is recognized as an authorized network device based, for example, on its MAC address. The in-game switch 60 is configured to store the received external IP address in a data structure 110 in its non-volatile memory 95.

If no response to the service discovery message has been received from the DHCP server 40, which may be caused by the network failure, congestion or other network or system problems, the in-game switch 60 may be configured to timeout for a predetermined, or randomly selected, period of time and to retry broadcasting the service discovery message upon expiration of this timeout period. This procedure assures that the backbone network 5 is not overflooded with similar requests from other in-game switches 60 and other network devices, which may also be trying to communicate with the boot server 35 and DHCP server 40 in the back office network 15.

In one embodiment, the in-game switch 60 is operative to manage and distribute the internal IP addresses to the in-game network devices 55 of a given gaming machine 50. To that end, the switch 60 is configured to determine the scope of the IP addresses that are to be leased to the associated in-game network devices 55. In one embodiment, the internal IP address scope information may be provided by the gaming network DHCP server 45. The gaming network DHCP server 45 may be implemented as a dedicated computer, or as a program running on a network router (not depicted), which connects the given gaming network 10 and the backbone IP network 5. Unlike the central DHCP server 40, the gaming network DHCP server 45 maybe primarily used to manage internal IP address scope information for all gaming machines 50 in the given gaming network 10. Thus, in one embodiment, each gaming network 10 may have its own gaming network DHCP server that manages scope of the internal IP address for gaming machines 50. This configuration improves system scalability and simplifying management of large, multi-casino gaming networks. For example, the gaming network DHCP server 45 may be utilized to set up different scopes of IP addresses for different gaming machines 50, a configuration which can be easily changed by the network administrator by increasing or decreasing IP address scope depending on the changing system requirements, such as number of active in-game network devices 55 in a given gaming machine 50.

In one embodiment, the network gaming environment may be configured in the following manner. Similar to the concept of Classless Inter-Domain Routing ("CIDR"), the IP address space can be divided into different size areas or subnets. For example, the IP address range for the gaming network 10 is 172.20.8.0 with a 21 bit subnet mask (255.255.248.0) would yield 2046 usable IP addresses: 172.20.8.1 to 172.20.15.254. It should be noted that even though the 21 bit subnet mask has 2048 addresses, the first, 172.20.8.0 and the last, 172.20.15.255 are typically not usable. All the routing on the gaming network would be at the full IP address space level, e.g. there would be one default gateway for the whole IP space, which in this example is the 172.20.8.0/21 range.

The entire address space maybe further divided into smaller blocks of addresses. For example, the centralized DHCP server 40 may reserve an address scope that includes addresses from 172.20.8.20 to 172.20.8.239 (a total of 220 centralized controlled DHCP addresses), which may be used to give out leases for the external IP addresses to the in-game switches 60 and other network devices in the gaming environment. The IP address in the 172.20.8.1 to 172.20.8.19 address range may be used for any static addressing needs. The gaming network DHCP Server 45 may then take the rest of the addresses, in the 172.20.8.240 to 172.20.15.254 range (a total of 1807 IP addresses), and divide that group into smaller address scopes to be used as internal IP addresses by in-game devices 55.

In one embodiment, the remaining block of the 1807 IP addresses may be divided into several different blocks of addresses depending on the current and long-range IP address needs of each gaming machine 50. For example, each gaming machine 50 may be assigned a number of IP addresses equal to, greater or less than the number of the in-game network devices 55 associated therewith. If at a later time, it is determined that the number of IP address allocated to a given gaming machine 50 is too large or too small, the address scope can be readily changed at the level of the gaming network DHCP server 45 or, in alternative embodiment, at the level of central DHCP server 40. The allocated IP addresses do not need to be in multiples of two, like the typical IP address subnets, because all that is being defined is a scope of the allocated IP addresses. This schema makes address allocation more efficient and readily scalable.

In one embodiment, the IP address scope may be defined by the system administrator in the gaming network DHCP server 45 or communicated thereto by the central DHCP server 40. The gaming network DHCP server 45 may then communicate the assigned IP address scope block information the in-game switches 60 upon requested therefrom. In one embodiment, all communications between the gaming DHCP server 40 and the in-game switches 60, and in particular transmission of the IP address scope information may be done via a Simple Network Management Protocol ("SNMP"). In this implementation, a special Management Information Base ("MIB") maybe created to store and to communicate IP address scope information. In alternative embodiments, other network protocols known to those of skill in the art, such as XML-based protocols, may be used to communicate IP address scope information.

The gaming network DHCP server 45 may transmit the IP address scope information to the in-game switches 60 in several different ways: In one embodiment, the gaming network DHCP server 45 may transmit a first IP address in the scope block and a number indicating the number of addresses in that scope chunk (i.e., scope handed out by the gaming network DHCP server 45). In one embodiment, this number maybe configurable with a default of eight. In another embodiment, the gaming network DHCP server 45 may transmit a first IP address and a last IP address of the assigned scope block. In alternative embodiments, other methods known to those of skill in the art may be used to communicate IP address scope information to the in-game switches 60.

Once received, the internal IP address scope block may be saved in a data structure 115 of the non-volatile memory 95. The in-game switch may then lease the assigned internal IP address to the associated in-game network devices 55, upon request therefrom, so that the latter can communicate with each other and other networked devices. In one embodiment, having extended a lease for an internal IP address, the in-game switch 60 may record the given IP address and the MAC address of the in-game network device 55 to which the given IP address was leased into a table 125, which may be stored in its volatile memory 100.

In the event the gaming network DHCP server 45 does not immediately respond to the request for the scope block from the in-game switch 60, which may be caused by the network failure, congestion or other network or system problems, the in-game switch 60 may be configured to timeout for a predetermined, or randomly selected, period of time and to retry requesting the IP address scope information again upon expiration of the timeout period. Meanwhile, the in-game switch 60 may capture all in-game service discovery requests, such as a DHCP_Discover or a BOOTP boot request message, from the in-game network devices 55, and in response temporarily lease to the in-game devices 55 IP addresses that were previously provided by the gaming network DHCP sever 45 and which are currently stored in the data structure 195 of the non-volatile memory 100 of the in-game switch 60. In this manner, the gaming network 10 is not flooded with service discovery requests from the in-game network devices 55, and the latter can use the provided temporary IP addresses to finish their boot-up and begin operating.

In another embodiment, if no IP addresses are stored in the data structure 195, the in-game switch 60 may temporarily lease IP address selected from a set of default IP addresses. Default IP address scope maybe stored in the default scope data structure 120 according to one embodiment. In either embodiment, the extended IP addresses may be temporarily used by the in-game devices 55 to finish boot up procedure or to communicate with each other, while the in-game switch 60 attempts to communicate with the gaming network DHCP server 45. This schema assures that the gaming network 10 is not overflooded with multiple service discovery requests from in-game devices 55, which may overload the gaming network DHCP server 45.

Once the communication with the gaming network DHCP server 45 is established and updated IP address scope information for the given gaming machine 50 is received from the gaming network DHCP server, the in-game switch 60 may terminate previously extended temporary IP address leases and in their stead reissue to the associated in-game devices 55 new internal IP addresses from the updated IP address scope block. In addition, the in-game switch 60 may update the table 125 in the volatile memory 100 with the updated IP address leases information. The in-game device 55 may then use their internal IP addresses to directly communicate with, for example, the boot server 35, which may provide gaming devices 55 with various network configuration information, such as default gateway, various server locations, etc., as well as with the updated content and other requested information.

In one embodiment, the in-game switch 60 may also facilitate distribution of various scope options, including, for example, Vendor Specific Information, to the in-game devices 55. The scope options information may be provided by the central DHCP server 40 or the gaming network DHCP server 45. The in-game switch 60 may request such scope options information from the central DHCP server 40 or from the gaming network DHCP server 45 using, for example, DHCP_Inform request or the like. The in-game switch 60 may store the received Vendor Specific Information in its non-volatile memory 100 by Vendor Class ID. This enables the in-game switch to be capable of storing multiple instances of the Vendor Specific Information so that each in-game switch device is capable of having a different set of Vendor Specific Information. The scope options information may be provided to the in-game devices 55 to facilitate system start-up. To request Vendor Specific Information from the in-game switch 60, the in-game devices 55 may, for example, use Vendor Class ID or other type of vendor identifier.

In another aspect of one embodiment, when the in-game switch receives a DCHP_Discover or DCHP_Request from the in-game devices, the in-game switch stores not only the MAC address, but also the Vendor Class ID for each device. This storage can be in the volatile memory. The in-game switch uses this information, as well as the DHCP_Inform command, to retrieve and store information in non-volatile memory by Vendor Class ID the Vendor Specific Information. Otherwise stated, the in-game switch captures the information from the Vendor Class ID in the Discover and/or Request packets and uses that information to acquire the actual Vendor Specific Information for that Vendor Class.

Several embodiments of methods for managing and distributing IP address information to the devices in the network gaming environment using the above-described system and network configuration will be described next with reference to FIGS. 4 and 5. These methods may be implemented in computer-executable instructions and embedded on a machine-readable media such as RAM, ROM, CD-ROM, DVD-ROM, flash memory or the like. These methods may also be executed by a general-purpose processor, such as Intel Pentium® processor or the like, an embedded processor, such as AMD K6®, IBM® PowerPC 750CX, NEC® VR 5432, or various custom-made processors known to those of skill in the art.

Figure 4:
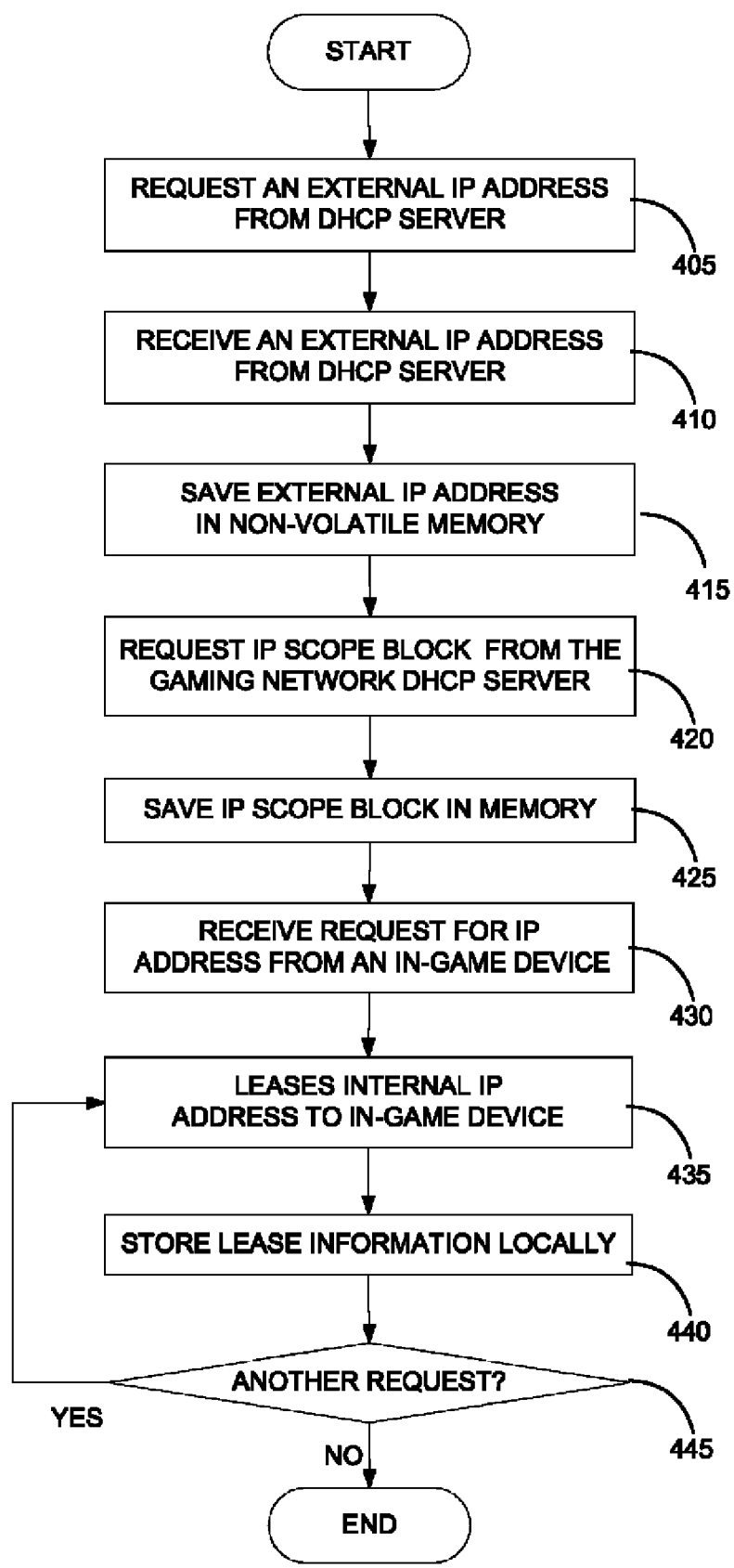
FIG. 4 illustrates a flow diagram of one method for managing IP addresses in a network gaming environment.

With reference to FIG. 4, provided a flow diagram of a method for managing and distributing IP addresses in a gaming environment in accordance with one embodiment. Preliminary, during system boot up, central boot server located in the back office network, and in particular its DHCP server component, initialize and begin listening for service discovery requests from other network devices on well-known locations within a gaming network. In some embodiments, the well-known location may include well-known TCP/IP ports reserved for boot services requests. However, other well-known locations, such as a URL or other address specification may also be used in alternative embodiments. Simultaneously, the various network devices, such as gaming machines, in-game switches and in-game network devices, boot up and begin broadcasting service discovery requests on their respective networks.

In one embodiment, the DHCP server receives a boot service discovery request originated from the in-game switch, step 405. The service discovery request may include a DHCP_Discover message broadcasted on the one or more network interfaces of the in-game switch. In alternative embodiment, the service discovery request may include a BOOTP boot request message. In response, the DHCP server may verify that the in-game switch is authorized to receive an IP communication address. In one embodiment, the DHCP server may check its MAC address validation table to see if the MAC address of the given in-game switch is listed there. If so, the DHCP server extends a lease for an external IP address and responds to the given in-game switch with a message containing the assigned IP address. Having received the IP address, step 410, the in-game switch may store it as an external IP address in its non-volatile memory data structure, step 415.

Next, the in-game switch may send a message to the gaming network DHCP server requesting an IP address scope block for the gaming devices associated with the given game, step 420. In one embodiment, the in-game switch may utilize a DHCP or BOOTP protocols to communicate with the gaming network DHCP server. In another embodiment, a Simple Network Management Protocol ("SNMP") may be used for that purpose. Yet in another embodiment, the in-game switch and the gaming network DHCP switch may communicate using a custom written protocol, such as XML-based or the like. The in-game switch then stores the received IP address scope block information in the non-volatile memory data structure, step 425.

Next, the in-game switch may receive service discovery requests, such as a DHCP_Discover request or a BOOTP boot request message, from the one or more in-game devices associated with the given gaming machine, step 430. In response, the in-game switch would extend a lease from the scope block of one of its internal IP address to the given in-game device, step 435. The in-game switch may also create a record in its table of extended leases indicating the assigned internal IP addresses and the MAC addresses of the in-game devices to which given internal IP addresses were assigned, step 440. The in-game switch may then listen on its network interfaces for other service discovery requests from other in-game network devices, step 445, and, if such requests are received, to repeat step 435 and 440 for these in-game devices as well.

Figure 5:
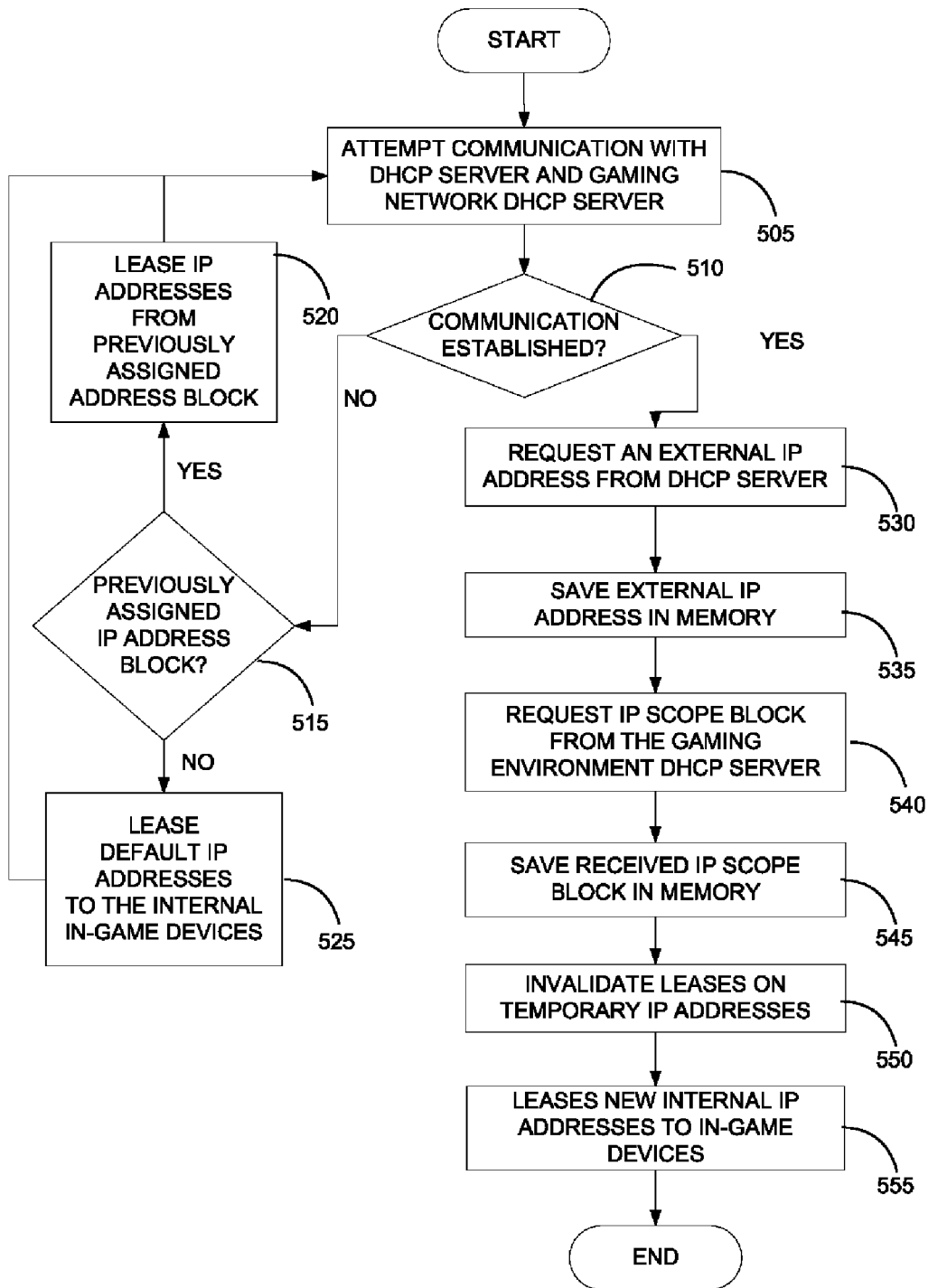
FIG. 5 illustrates a flow diagram of another method for managing IP addresses in a network gaming environment.

With reference to FIG. 5, provided a flow diagram of a method for managing and distributing IP addresses in a gaming environment in accordance with another embodiment. During boot up, the in-game switch attempts to communicate, using for example a DHCP protocol, a BOOTP protocol or the like, with the DHCP server to receive its external IP address and with the gaming network DHCP server to receive its internal IP addresses scope block, step 505. In the event such communication fails, step 510, due to a possible network failure, congestion, or other network or system problems, the in-game switch may timeout for a predetermined, or randomly selected, period of time and attempt to retry communicating with the central DHCP server and gaming network DHCP server again upon expiration of the timeout period.

During the timeout period, however, the in-game switch may capture all in-game service discovery requests, such as DHCP_Discover or the like, from the in-game network devices associated with the given gaming machine. If such requests are received, the in-game switch may first determine whether an IP address block has already been assigned by the gaming environment DHCP server, step 515. If such IP address block was already assigned and therefore is stored in the non-volatile memory of the in-game switch, the in-game switch may extend temporary IP addresses from such previously assigned IP address block (i.e., saved scope chunk), step 520. If an IP address block was not previously communicated by the gaming network DHCP server, the in-game switch may temporarily extend leases for the internal IP addresses from a block of default IP addresses, which is stored in the default scope data structure of the in-game switch, step 525. In either case, the in-game devices may temporarily use the extended IP addresses to complete the boot up procedures and/or to communicate with other networked device while the in-game switch attempts to establish communication with the central DHCP server and the gaming network DHCP server, step 505. The temporary IP addresses may also be stored along with the MAC addresses of the corresponding in-game devices in a table in the volatile memory of the in-game switch.

Once the communication with the central DHCP server has been established, step 510, the in-game switch may request an external IP address from the central DHCP server, step 530, and store the received IP address in its non-volatile memory, step 535. The in-game switch may then request from the gaming network DHCP server a block scope of the internal IP addresses for the associated in-game devices, step 540. The in-game switch may store the received block scope in its non-volatile memory data structure, step 545. The in-game switch may then invalidate all leases from temporary IP addresses previously extended to the associated in-game devices, step 550, and in their stead reissue to the associated in-game devices new internal IP addresses from the newly assigned block scope, step 555. In addition, the in-game switch may update the table of leased IP addresses in its volatile memory with the updated IP address lease information.

The foregoing description, for purposes of explanation, uses specific nomenclature and formula to provide a thorough understanding of the invention. It should be apparent to those of skill in the art that the specific details are not required in order to practice the invention. The embodiments have been chosen and described to best explain the principles of the invention and its practical application, thereby enabling others of skill in the art to utilize the invention, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

What is claimed is:

1. A method for managing internet protocol (IP) addresses in a gaming network having one or more gaming machines, wherein a gaming machine includes one or more in-game network devices, the method comprising:
    determining an external IP address associated with a given gaming machine;
    determining an internal IP address scope associated with the given gaming machine;
    receiving a request for an internal IP address from an in-game network device associated with the given gaming machine;
    leasing to the in-game network device a temporary internal IP address selected from a default IP address scope when an updated external IP address and an updated internal IP address scope are not received from a host after a power outage for the gaming network, wherein the default IP address scope does not include a previously leased IP address; and
    updating the temporary internal IP address for the in-game network device when an updated internal IP address scope is received by the in-game network device.

2. The method of claim 1, wherein determining the external IP address comprises: (i) broadcasting a service discovery message, and (ii) receiving the external IP address from a remote Dynamic Host Configuration Protocol (DHCP) server in response to the service discovery message, wherein the remote DHCP server is external to the gaming network.

3. The method of claim 2, wherein broadcasting a service discovery message comprises broadcasting one of a DHCP discover message and Boot Protocol (BOOTP) boot request message.

4. The method of claim 2, further comprising storing the received external IP address in a non-volatile memory.

5. The method of claim 2, further comprising: leasing to the in-game network device a temporary internal IP address selected from one of a previously assigned internal IP address scope and a default IP address scope, if the external IP address is not received from the remote DHCP server.

6. The method of claim 1, wherein determining the internal IP address scope comprises: (i) requesting the internal IP address scope from a local DHCP server, and (ii) receiving the internal IP address scope from the local DHCP server, wherein the local DHCP server is internal to the gaming network.

7. The method of claim 6, further comprising storing the received internal IP address scope in a non-volatile memory.

8. The method of claim 6, further comprising: leasing to the in-game network device a temporary IP address selected from one of a previously assigned internal IP address scope and a default IP address scope, if the internal IP address scope is not received from the local DHCP server.

9. The method of claim 6, wherein receiving a request from the in-game network device for an internal IP address comprises receiving one of a DHCP discover message and BOOTP boot request message.

10. A method for managing internet protocol (IP) addresses in a gaming network having one or more gaming machines, wherein a gaming machine includes one or more in-game network devices, the method comprising:
    requesting an updated external IP address associated with a given gaming machine;
    requesting an updated internal IP address scope associated with a given gaming machine;
    receiving a request for an internal IP address from an in-game network device associated with the given gaming machine;
    leasing to the in-game network device a temporary internal IP address selected from a default IP address scope, when an updated external IP address and an updated internal IP address scope are not received from a host after a power outage for the gaming network, wherein the default IP address scope does not include a previously leased IP address; and
    updating the temporary internal IP address for the in-game network device when an updated internal IP address scope is received by the in-game network device.

11. The method of claim 10, wherein requesting the updated external IP address comprises: (i) broadcasting a service discovery message, and (ii) receiving the updated external IP address from a remote Dynamic Host Configuration Protocol (DHCP) server in response to the service discovery message, wherein the remote DHCP server is external to the gaming network.

12. The method of claim 11, wherein broadcasting a service discovery message comprises broadcasting one of a DHCP discover message and Boot Protocol (BOOTP) boot request message.

13. The method of claim 11, further comprising storing the received updated external IP address in non-volatile memory.

14. The method of claim 10, wherein requesting the updated internal IP address scope comprises: (i) requesting the updated internal IP address scope from a local DHCP server, and (ii) receiving the updated internal IP address scope from the local DHCP server, wherein the local DHCP server is internal to the gaming network.

15. The method of claim 14, further comprising storing the received updated internal IP address scope in non-volatile memory.

16. The method of claim 14, wherein receiving a request from the in-game network device for an internal IP address comprises receiving one of a DHCP discover message and BOOTP boot request message.

17. The method of claim 10, further comprising:
terminating one or more leases for the temporary IP addresses upon receipt of the updated external IP address and the updated internal IP address scope; and
leasing an internal IP address selected from the updated internal IP address scope to the in-game network device.

18. An method for managing internet protocol (IP) addresses in a gaming network having one or more gaming machines, wherein a gaming machine includes one or more in-game network devices and an in-game switch configured to manage an internal IP address scope for the one or more in-game network devices, the method comprising:
requesting an updated external IP address associated with a given gaming machine;
requesting an updated internal IP address scope associated with a given gaming machine;
requesting scope options information and vendor specific information associated with a given gaming machine;
receiving a request for an internal IP address from an in-game network device associated with the given gaming machine;
leasing to the in-game network device a temporary internal IP address selected from a default IP address scope when an updated external IP address and an updated internal IP address scope are not received from a host after a power outage for the gaming network, wherein the default IP address scope does not include a previously leased IP address;
dispensing to the in-game network device scope options information and vendor specific information; and
replacing the temporary internal IP address for the in-game network device when the in-game switch receives (i) an updated external IP address information, (ii) an updated internal IP address scope information, (iii) updated scope options information, and (iv) updated vendor specific information.

19. The method of claim 18, further comprising: storing through the in-game switch, the received updated information in the data structure in the non-volatile memory.

20. The method of claim 19, wherein the storing further comprises: storing the received updated information in the data structure in the non-volatile memory by vendor class identification and enabling the in-game switch to store multiple instances of the vendor specific information and provide each in-game switch device with a different set of vendor specific information.

21. The method of claim 19, further comprising: dispensing through the in-game switch, the updated information stored in the non-volatile memory to the in-game network device upon request therefrom.

22. The method of claim 18, wherein the in-game switch requests the scope options information from the central DHCP server or from the gaming network DHCP server.

23. The method of claim 18, wherein the in-game switch requests the vendor specific information from the central DHCP server or from the gaming network DHCP server.

* * * * *

UNITED STATES PATENT AND TRADEMARK OFFICE
CERTIFICATE OF CORRECTION

| | | |
|---|---|---|
| PATENT NO. | : 8,259,596 B1 | Page 1 of 1 |
| APPLICATION NO. | : 11/464906 | |
| DATED | : September 4, 2012 | |
| INVENTOR(S) | : Steven R. Oak | |

It is certified that error appears in the above-identified patent and that said Letters Patent is hereby corrected as shown below:

In the Specifications:

Column 6, In line 34, replace "maybe" with --may be--

Column 7, In line 55, replace "with" with --which--

Signed and Sealed this
Twenty-third Day of April, 2013

Teresa Stanek Rea
*Acting Director of the United States Patent and Trademark Office*